March 7, 1950      W. P. EWALD      2,500,027
FRAME COUNTER
Filed May 3, 1947
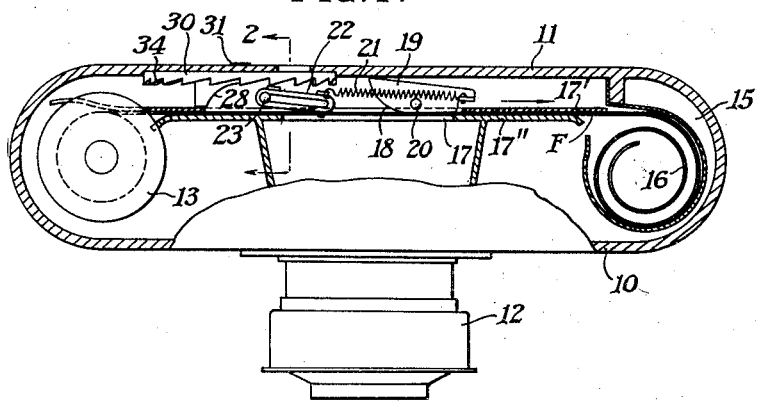
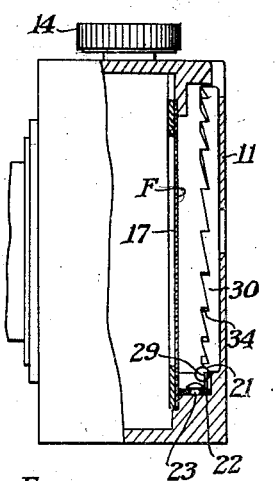
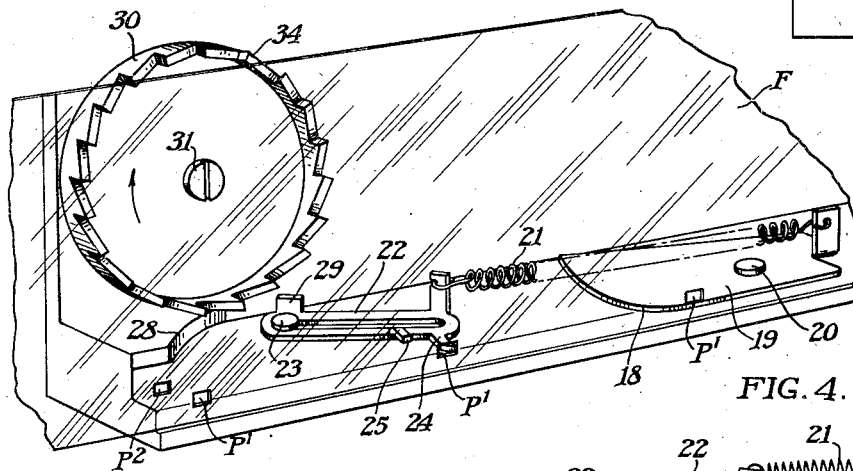
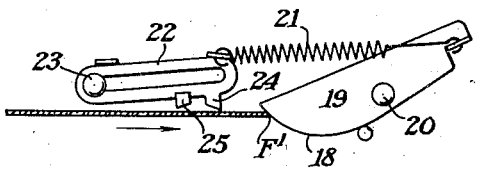
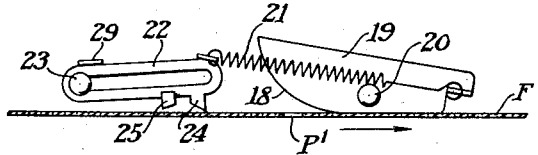
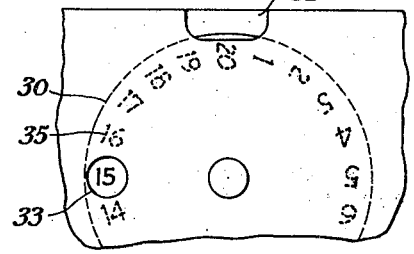
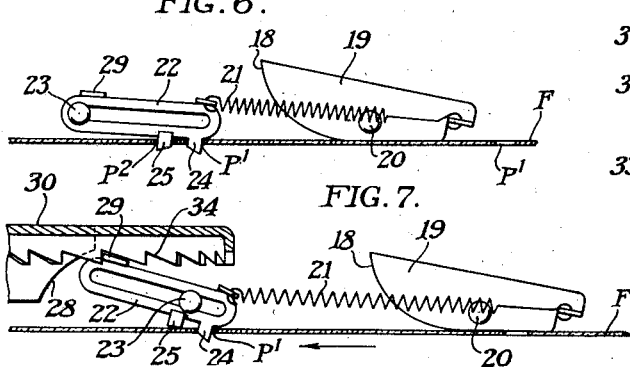
WILLIAM P. EWALD
INVENTOR
BY Newton M. Perrins
Clarence W. Carroll
ATTORNEY & AGENT Patented Mar. 7, 1950

2,500,027

UNITED STATES PATENT OFFICE 2,500,027

FRAME COUNTER

William P. Ewald, Rochester, N. Y., assignor to Eastman Kodak Company, Rochester, N. Y., a corporation of New Jersey Application May 3, 1947, Serial No. 745,889

8 Claims. (Cl. 235—91)

This invention relates to photography, and in particular to devices for presenting to the user of a roll-film camera a visual indication of the status of a film strip within a camera; i. e., the number of "frames" that have passed the exposure aperture, or the number of frames exposed or to be exposed.

The frame counter in its preferred form as presented herewith is intended for use in a camera in which almost the entire film strip is fed off from a roll into a receiving chamber prior to the taking of any pictures, the film being brought to a stop automatically. The film is then rewound manually to bring picture-sized portions thereof into register with an exposure aperture, one at a time, each of such rewind steps operating the visual frame counter to apprise the operator as aforesaid of the number of pictures exposed.

One adaptation of the invention as applied to a roll-film camera is illustrated in the drawings herewith, in which some parts are omitted to enable those famaliar with camera construction to more readily follow the described operation and in which:

Fig. 1 is a top plan of a camera partially broken away to show the frame counter;

Fig. 2 is a section through the camera on line 2—2 of Fig. 1;

Fig. 3 is a perspective view of the essential parts of the device;

Fig. 4 is a partial plan view of certain portions, shown as the leading edge of a film engages one member;

Figs. 5, 6, and 7 are similar views, with the parts of Fig. 4 shown in successive operating positions; and Fig. 8 is a fragmentary rear elevation of the camera shown in Figs. 1 and 2.

Referring first to Fig. 1, a camera of a standard type is shown, which has a body 10 with a rear wall 11, a lens-and-shutter assembly 12, and a film supply spool 13 which may be rotated by an exterior knob 14. It is intended that the film F is to be unwound from the supply spool 13 through suitable guideways 17' and 17'' by rotation of knob 14 (clockwise in Fig. 1), and into a receiving chamber 15 where it curls up into a loose coil 16. The operator then will rewind this film onto the spool 13 by turning knob 14 in the opposite direction for taking successive pictures, each exposure being made through a frame or exposure aperture 17 forming a portion of the guideways above mentioned.

In Fig. 3 the film F is represented as a transparent strip, so as to permit the relation of the operating parts to be readily understood. Actually, of course, photographic film is opaque.

When the knob 14 is turned clockwise, the leading end $F^1$ of the film strikes a cam-like edge 18 of a lever 19, pivoted at 20 on the camera body, and as it progresses, the film tilts this member to the position of Figs. 5, 6, and 7, where it remains until the film is rewound to the spool 13. The tilting of the lever 19, hereinafter referred to as the control member of the counter, results in a change in the relative positions of a coil spring 21 and a slidable operating member 22, so that the spring may exert a greater thrust toward the film upon the right end of this slidable member. It will be seen that the member 22 is a slotted bar, guided to some extent by a pivot 23, so that it may both turn and slide on said pivot. When the control member 19 rests on the film F, as in Fig. 5, a moderate tension is set up in spring 21 which tends to force a pair of lugs 24 and 25 against the back of the film.

Aligned perforations $P^1$ are provided in the film F near one edge, located at the required intervals equal to the width of the aperture 17 plus a slight additional picture separation space, as is usual in roll-film cameras. The lug 24 is so proportioned that it will drop into each of these perforations $P^1$ as the film moves toward chamber 15, but will bob out again because the lug is beveled on the side toward spool 13. When the film has been unwound to a predetermined extent, leaving only a few convolutions on the spool, a single perforation $P^2$ (Fig. 6) is brought into register with lug 25, and this lug may drop into the last perforation $P^1$. The lugs 24 and 25 are in different horizontal planes and the perforations $P^2$ is offset from the other perforations $P^1$ by the same amount. After the action just described occurs, the film F cannot be moved any further toward the chamber 15, because the lug 25 is beveled in the opposite manner to lug 24, and so constitutes a positive stop for the film.

At this point the operator may manually set a visual indicator element 30, pivoted at 31 in the rear wall of the camera and accessible through a notch 32 (Fig. 8), so that numeral "1" thereon may be seen through an observation port 33. The element 30 is a cup-like disk, having ratchet teeth 34 in its front periphery corresponding in total with the digits 35 on its rear face. These teeth are arranged so that they may be engaged by a lug 29 which extends upwardly from the left end of operating member 22. Adjacent to the lower center of the disk 30 is a fixed cam 23 extending forwardly in such a manner that the lug 29 will strike it and be freed from the teeth 34 whenever the member 22 is moved farther to the left than shown in Fig. 7.

After the operator has taken the first picture, he may start to rewind the film onto spool 13. The first perforation P¹ is well engaged with lug 24, and lug 25 is still in perforation P². The movement of the film thus carries member 22 to the left, and because the resistance of spring 21 increases, member 22 tilts clockwise about pivot 23, withdrawing lug 25 from perforation P¹, and moves lug 29 against one of the teeth 34 on the front of disk 30. The parts are so proportioned that just as an area of film on which picture No. 2 may be made comes fully into the exposure frame 17, the lug 29 will have moved disk 30 around clockwise (Fig. 3) one tooth space to bring numeral 2 into port 33, and simultaneously, the fixed cam 28 will divert lug 29 forwardly, freeing it from the teeth 34. Spring 21 slides operating element 22 to normal position (Fig. 5) and during the next partial-frame rewind lug 24 rides on the back of the film. When the next "frame" of film is about ¾ of its travel into the aperture 17, lug 24 drops into the next perforation P¹, and having so re-engaged the film, member 22 is again slid to the left, again turning disk 30 by means of lug 29, and advancing the counter another digit, and eventually being freed from the teeth 34 again by cam 28. This cycle recurs for each frame rewound, and when the end F¹ of the film passes the primary or control lever 19, the spring 21 acts on it and member 22 to pull them closer together, resulting in a slight lift of member 22 (Fig. 4) to a position where both lugs 24 and 25 are clear of the film.

From the foregoing it is clear that the frame counter as contemplated in a preferred construction according to this invention comprises three essential elements, viz., a control or initiating member acted on by the end of the film; a slidable pivoted operating member for engaging perforations in the film and adapted to be moved with and by the film and by the first member, and a step-by-step visible indicator actuated by the slidable member. However, modifications and minor variations may be adopted in the commercial use of the device, and all such are to be constructed as of the scope of the invention, provided they are definable by the following claims.

I claim:

1. A frame counter for use in a camera which uses roll film traversable in opposite directions across a frame aperture said film having aligned perforations defining frame spacings and a perforation offset from the aligned perforations, said counter comprising, in combination, a visible frame indicator; a control member lying in the path of and adapted to be set by the leading end of a film; a slidable operating member connected with and positioned by the control member to and from a film engaging position and adapted to limit the traversal of the film in one direction by engaging the offset perforation, said operating member also when in a film engaging position being adapted to engage any of the aligned perforations and to be moved by the film when the latter is traversed in another direction; and means carried by the operating member for engaging and moving the counter to advance the visible indicator in accordance with the movement of said member by the film.

2. A frame counter for use in a camera which uses roll film having a row of frame-spaced perforations and another perforation offset from said row, comprising, in combination, a visible rotary indicator bearing frame indicia; a pivoted control member lying in the path of the film and movable to a control position by an end of the film when the latter is traversed through the camera in one direction; an operating member slidably and pivotally mounted and positionable by the control member to and from a film engaging position; said operating member being adapted to engage the offset perforation to limit the traversal of the film in one direction and to engage any of the row of perforations in the film when the latter is traversed in another direction to move said operating member thereby into engagement with the indicator; means for disengaging the operating member from the indicator after the latter has been advanced by said member one digit; and means for returning said member to a position to engage a succeeding film perforation.

3. A frame counter for use in a camera using perforated roll film and having an exposure frame and means for moving the film across said frame in opposite directions, the film having a row of frame-spaced perforations and another perforation offset from said row, said counter comprising, in combination, a visible indicator bearing frame indicia, an operating member slidably and pivotally mounted and adapted to stop the film at a predetermined point during its traversal in one direction by engaging the offset perforation and to engage any one of the row of perforations and be moved by the film when the latter is traversed in another direction; a control member connected with said operating member and movable to a control position by a leading end of the film; means whereby said control member renders the operating member effective when moved to said control position, to advance the indicator in accordance with the traversal of the film; and means for disengaging said operating member from the indicator when the latter has been advanced one frame number.

4. A frame counter for use in a camera using perforated roll film in which said film is movable from a supply source to a receiving station before exposure and is then rewound to the supply source across an exposure frame one frame at a time for successive exposures, said counter comprising, in combination, a visible indicator bearing frame indicia; a control member lying in the path of and movable by the leading end of the film as the latter is traversed toward the receiving station; a slidable operating member spring-connected with the control member and movable thereby to a film engaging position when the control member is moved as aforesaid; means whereby the operating member when in a film engaging position may limit the movement of the film toward the receiving station; a projection on the operating member adapted to engage a perforation in the film as the latter is rewound toward the supply source, whereby the film may move the operating member to engage and advance the indicator one digit; and means for disengaging the operating member from the indicator and repositioning it to engage a succeeding perforation.

5. A frame counter according to claim 4 characterized particularly by the operating member being a slotted plate slidable and oscillatable about a pivot, and having lugs adapted to engage, respectively, the film perforations, the indicator, and a fixed projection in the camera.

6. A frame counter according to claim 4 in which the operating member is so connected with the control member that said operating member is ineffective until the control member is moved by the leading end of a film to a control position.

7. A frame counter according to claim 4 in which a spring connects the control member and the operating member and the tension of the spring is increased after the control member is positioned by the leading end of a film and thereby renders the operating member effective.

8. A frame counter for use in a camera which uses film having a row of frame-determining perforations and a perforation offset from said row, and including means for traversing the film from a supply chamber to a receiving station before exposure and for returning the film to the supply chamber in successive steps past an exposure frame, said counter comprising, in combination, a visible rotary indicator bearing frame indicia; a control member lying in the path of the film and movable about a pivot by the leading end of the film as the latter moves toward the receiving station; a slotted operating member movable by the control member and arranged for sliding and turning movement and having a projection adapted to engage the offset perforation and stop the film near the end of the first traverse thereof, and having a second projection adapted to engage any of the row of perforations during the return traverse of the film and thereby to be moved by the film, said operating member also having a third projection engageable with the indicator to advance the latter during the return traverse of the film; and means for disengaging the operating member from the indicator and resetting it for engagement with a succeeding perforation, said means including a spring connection with the control member.

WILLIAM P. EWALD.

REFERENCES CITED

The following references are of record in the file of this patent:

UNITED STATES PATENTS

| Number | Name | Date |
| --- | --- | --- |
| 645,370 | McCurdy | Mar. 13, 1900 |
| 666,556 | Prentice | Jan. 22, 1901 |
| 2,167,459 | Long | July 25, 1939 |
| 2,254,478 | Fodor | Sept. 2, 1941 |